United States Patent
Kashiwagi et al.

(10) Patent No.: US 7,133,378 B2
(45) Date of Patent: Nov. 7, 2006

(54) BASE STATION FOR WIRELESS COMMUNICATION AND METHOD FOR SETTING UP FREQUENCY BAND IN THE BASE STATION

(75) Inventors: Kenji Kashiwagi, Minamiashigara (JP); Hitoshi Yokota, Kawasaki (JP); Kenichi Yoshida, Ebina (JP)

(73) Assignee: Hitachi, Ltd., Tokyo (JP)

( * ) Notice: Subject to any disclaimer, the term of this patent is extended or adjusted under 35 U.S.C. 154(b) by 789 days.

(21) Appl. No.: 09/978,554

(22) Filed: Oct. 18, 2001

(65) Prior Publication Data

US 2002/0098870 A1  Jul. 25, 2002

(30) Foreign Application Priority Data

Jan. 19, 2001  (JP) .............................. 2001-010970

(51) Int. Cl.
  *H04Q 7/00* (2006.01)
(52) U.S. Cl. ...................... 370/328; 455/446; 370/338
(58) Field of Classification Search ................ 370/310, 370/328, 338
  See application file for complete search history.

(56) References Cited

U.S. PATENT DOCUMENTS

| | | | |
|---|---|---|---|
| 4,792,984 A * | 12/1988 | Matsuo ....................... 340/7.42 |
| 5,613,213 A * | 3/1997 | Naddell et al. .......... 455/435.2 |
| 5,737,691 A * | 4/1998 | Wang et al. ................ 455/63.3 |
| 5,870,385 A * | 2/1999 | Ahmadi et al. ............. 370/252 |
| 5,943,622 A * | 8/1999 | Yamashita .................. 455/509 |
| 6,101,176 A * | 8/2000 | Honkasalo et al. ......... 370/335 |
| 6,188,906 B1 * | 2/2001 | Lim et al. ................... 455/453 |
| 6,356,540 B1 * | 3/2002 | Kojiro ........................ 370/330 |
| 6,505,045 B1 * | 1/2003 | Hills et al. .................. 455/449 |
| 6,529,488 B1 * | 3/2003 | Urs et al. .................... 370/330 |
| 6,597,671 B1 * | 7/2003 | Ahmadi et al. ............. 370/329 |
| 6,600,914 B1 * | 7/2003 | Uhlik et al. ............. 455/404.1 |
| 6,636,737 B1 * | 10/2003 | Hills et al. .................. 455/450 |
| 6,909,705 B1 * | 6/2005 | Lee et al. .................... 370/338 |
| 6,909,737 B1 * | 6/2005 | Kockmann et al. ......... 375/133 |

FOREIGN PATENT DOCUMENTS

JP  9-275401  10/1997

* cited by examiner

*Primary Examiner*—Bob A. Phunkulh
(74) *Attorney, Agent, or Firm*—Mattingly, Stanger, Malur & Brundidge, P.C.

(57) ABSTRACT

A wireless LAN system is provided to make a frequency band setup task easy such that interference among base stations is reduced. The base station connected to a wired LAN includes a wired connection unit connected to the wired LAN and a wireless communication unit communicating with a LAN terminal via radio waves. The base station finds frequency bands already used by other devices in a place where the base station is installed and sets up a frequency band not used by the other devices as a frequency band to be used by the wireless communication unit to automatically set up a frequency band of radio waves to be used by the wireless communication unit.

32 Claims, 11 Drawing Sheets

| | SETUP INFORMATION | | | NO. OF WIRELESS STATIONS IN AREA | STATION WITH OVERLAPPING COVERAGE | STATUS OF OTHER CHANNEL | PRIORITY |
|---|---|---|---|---|---|---|---|
| | CH | S/N | Packet Error | | | | |
| A1 | 1 | 40dB | 0.01% | 2 | A1 | | 2 |
| A2 | 2 | 30dB | 0.02% | 2 | A2 | | 1 |

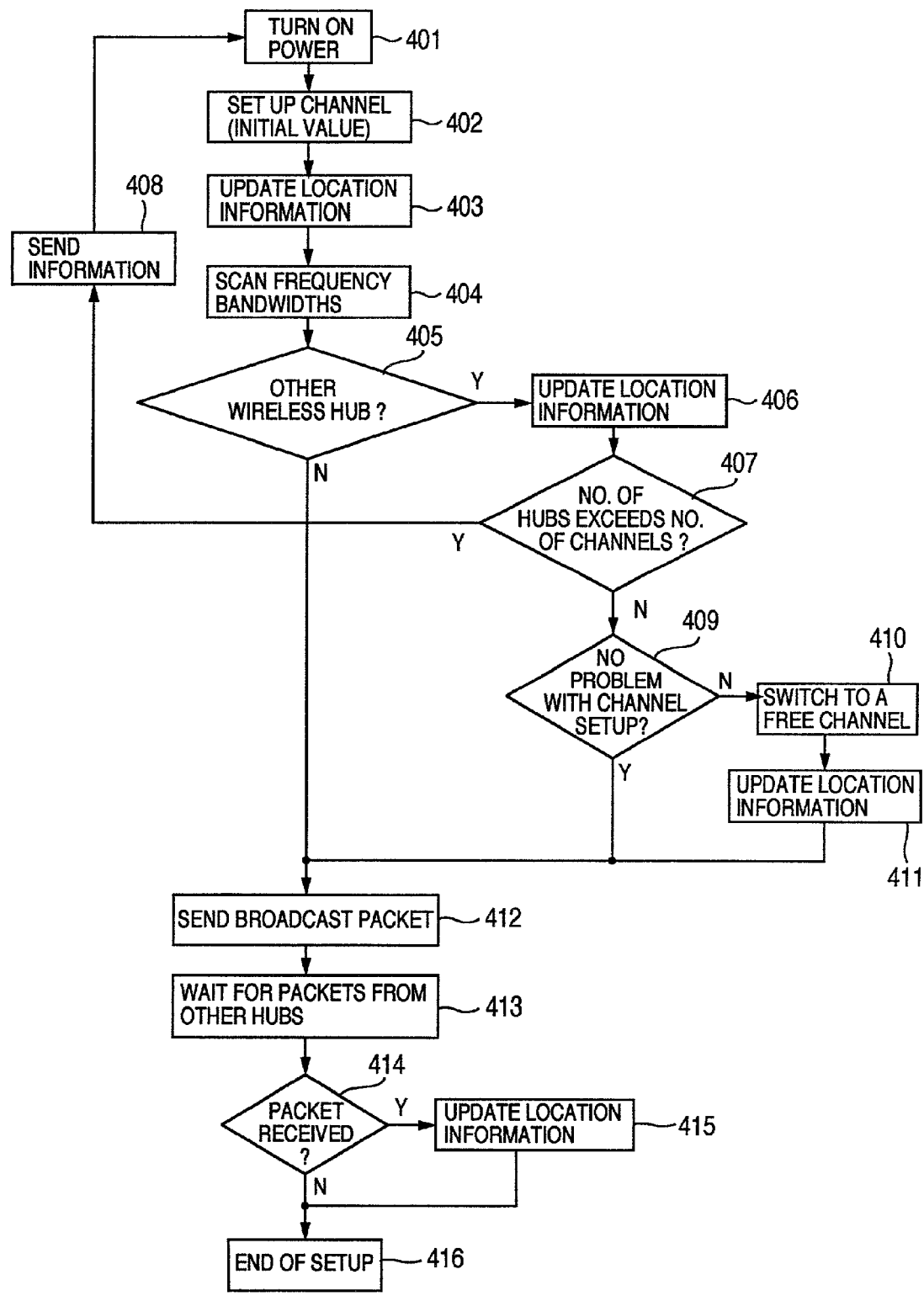

|   | SETUP INFORMATION | | | NO. OF WIRELESS HUBS IN AREA | HUB WITH OVERLAPPING COVERAGE | STATUS OF OTHER CHANNEL | PRIORITY |
|---|---|---|---|---|---|---|---|
|   | CH | S/N | Packet Error | | | | |
| A1 | 1 | 40dB | 0.010% | 3 | A2, A4 | | 3 |
| A2 | 2 | 30dB | 0.013% | 4 | A1, A3, A5 | | 2 |
| A3 | 3 | 45dB | 0.009% | 3 | A2, A6 | | 4 |
| A4 | 3 | 50dB | 0.008% | 3 | A1, A5 | | 5 |
| A5 | 4 | 25dB | 0.015% | 4 | A2, A4, A6 | | 1 |
| A6 | 1 | 55dB | 0.007% | 3 | A3, A5 | | 6 |

BASE STATION FOR WIRELESS COMMUNICATION AND METHOD FOR SETTING UP FREQUENCY BAND IN THE BASE STATION

BACKGROUND OF THE INVENTION

The present invention relates to the technology of setting up frequency bands used by base stations that communicate with wireless terminals. More particularly, the present invention relates to the technology of setting up frequency bands for a plurality of base stations in a system where a plurality of base stations in communication with a plurality of wireless terminals are connected to networks such as wired LANS.

In a system where a plurality of base stations are provided, radio signal interference sometimes causes communication errors. Interference may be caused by radio waves from other base stations, by radio waves from wireless communication terminals connected to other base stations, or by external noises independent of a wireless LAN system.

Today, three spread spectrum communication methods are in common use for wireless LAN communication: direct sequence (hereinafter called DS), frequency hopping (hereinafter called FH), and a combination of both. In the DS method, a base station (for example, a wireless communication hub) spreads the frequency by transferring a signal to which a code, which indicates a specific frequency bandwidth occupied by the base station, is attached. In the FH method, each hub transfers signals while changing the frequency at a regular interval. Although both methods are designed to be less susceptible to noises, the DS method that occupies a specific frequency bandwidth for data transmission transfers signals more speedily than the FH method that transfers each unit of data across a specific frequency bandwidth.

In practice, about 20 wireless terminals may be connected to one wireless hub. Therefore, many wireless terminals require many base stations. When installing a plurality of base stations in the same area, an arrangement and a method that eliminate interference among base stations are required.

An earlier patent disclosure dealing with this is found, for example, in JP-A-9-275401. In this example, the master hub, one of the plurality of wireless hubs, specifies frequency bandwidths to be used by other hubs to minimize interference among the coverage areas of wireless LAN systems each using the FH method. This technology, specifically designed for the FH method, is not applicable to the DS method that occupies a particular bandwidth.

The DS method, which allows one of the base stations to occupy a particular frequency bandwidth, does not allow two base stations to share the same bandwidth when the coverage areas of a plurality of base stations overlap. Therefore, the system must prevent interference in one of two ways: (1) prevent the coverage area 123A of a base station 121A on a wired LAN 120 from overlapping the coverage area 123B of a base station 121B on the wired LAN as shown in FIG. 11 and (2) separate the frequency bandwidth of the base station 121A and that of the base station 121B.

Currently, the set-up task such as the allocation of frequencies to base stations is performed manually. Therefore, as more base stations are used in the as same area, it becomes more difficult to implement the optimum setup because interference among base stations must be considered and, at the same time, the setup task takes long. More base stations in the same area result in more wireless terminals connected to the base stations. An increase in the number of wireless terminals makes the setup task even more difficult. In addition, unexpected external noises, as well as interference caused by wireless terminals used by moving users, must be considered.

SUMMARY OF THE INVENTION

It is an object of the present invention to provide a technology that makes easy the frequency setup task that reduces interference among base stations in a wireless LAN system. In particular, it is an object of the present invention to provide a technology that is effective for a wireless LAN system including base stations each using the FH method.

It is also an object of the present invention to reduce setup manpower required to avoid interference among base stations and to reduce setup errors. Other objects of the present invention will become apparent in the specifications.

To solve the above objects, a base station connected to a wired LAN according to the present invention comprises a wireless communication unit that communicates with a LAN terminal over radio waves and a controller that sets up a frequency band to be used by the base station, wherein the base station detects, via the wireless communication unit, a first device that is in the coverage area of the base station and that issues radio waves in a first frequency band. Essentially, the controller sets up a frequency band different from the frequency band generated from the detected first device.

In addition, the controller of the base station according to the present invention generates information on other wireless devices in the coverage area with which the controller may communicate via the wireless communication unit. Using this information, the controller sets up a frequency band.

In addition, the controller of the base station according to the present invention obtains information on other base stations connected to the wired LAN to which the base station connects and stores the obtained information in a storage unit of the base station.

Preferably, the information on other base stations includes the frequency bands used by those other base stations and the number of base stations included in the radio coverage area.

The base station according to the present invention allows an operator to set up a frequency band to be used by a base station with no interference with other base stations. At the same time, the base station according to the present invention allows a base station to use a frequency band while reducing the amount of frequency band setup change processing performed by each base station.

The base station according to the present invention minimizes interference between base stations connected to a wired LAN. At the same time, even if interference is caused by a wireless terminal connected to a base station via radio waves or even if an unexpected external noise is generated, the base station makes it possible to change the setup to the optimum setup quickly and automatically. Also, for use in an installation or station having two or more wired LANs where the coverage areas of base stations connected to separate wired LANs overlap, the present invention provides a method for automatically setting up a base station as well as a base station containing the method.

BRIEF DESCRIPTION OF THE DRAWINGS

FIG. 4 is a flowchart showing the processing of a controller in the wireless hub for setting up a frequency (channel) to be used by a newly installed wireless hub.

DETAILED DESCRIPTION OF THE EMBODIMENTS

Some embodiments of the present invention will be described in detail with reference to the attached drawings.

Figure 1:
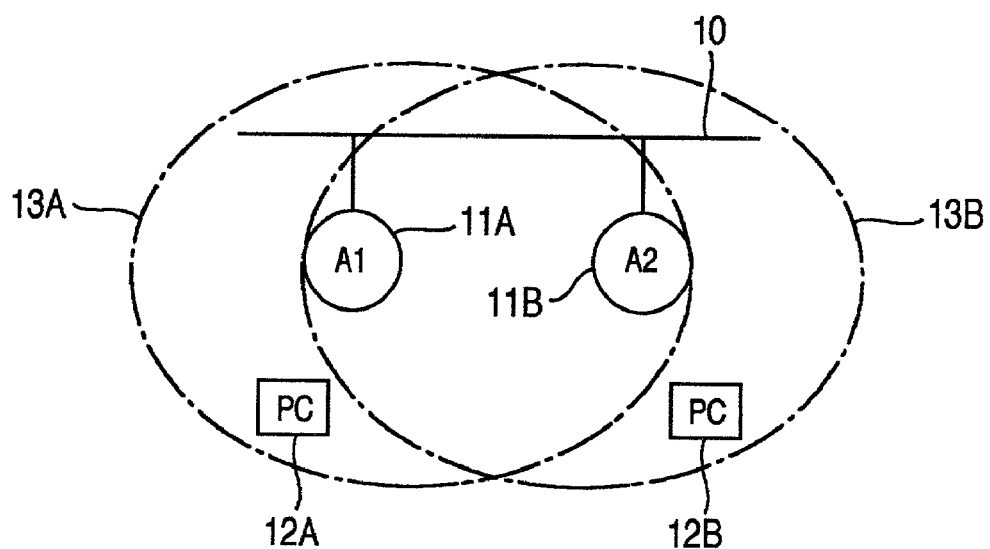
FIG. 1 is a diagram showing an example in which two wireless hubs connect a wireless LAN system, to which the present invention is applied, to a wired LAN.

FIG. 1 shows a wireless LAN system in which two wireless hubs are connected to a wired LAN. In this embodiment, when a new wireless hub is connected, an existing wireless hub and the new wireless hub are in the coverage area of the other. In this case, the new wireless hub is set up such that it does not cause interference while keeping the setup of the existing wireless hub unchanged.

Two wireless hubs, 11A and 11B, are connected to a wired LAN 10. These wireless hubs A1 and A2 (11A, 11B) communicate with wireless terminals (12A, 12B) via radio waves. A wireless hub is, for example, is a terminal adapter (hereinafter called TA), a hub in a wireless LAN, and so on. A wireless terminal is, for example, a personal computer, a peripheral device, and so on, with the wireless communication function to communicate with a wireless hub. The coverage area of the wireless hub A1 (11A) is a range enclosed by 13A, and the coverage area of the wireless hub A2 (11B) is a range enclosed by 13B. In the embodiments described below, an example will be described in which a different communication frequency is automatically allocated to each wireless hub to prevent interference among wireless hubs.

Figures 2A, 2B:
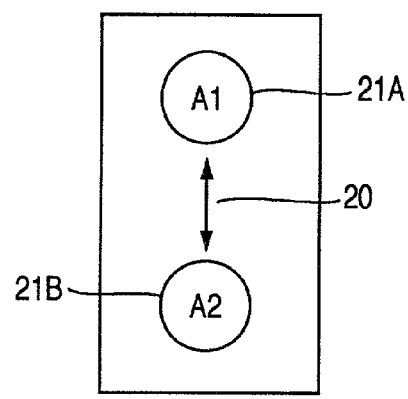
FIG. 2A is a diagram schematically showing the interference relation between wireless hubs in the wireless LAN system in FIG. 1.
FIG. 2B is a diagram showing location information (setup information) stored in each wireless hub as data indicating the interference relation shown in FIG. 2A.
Figure 3A:
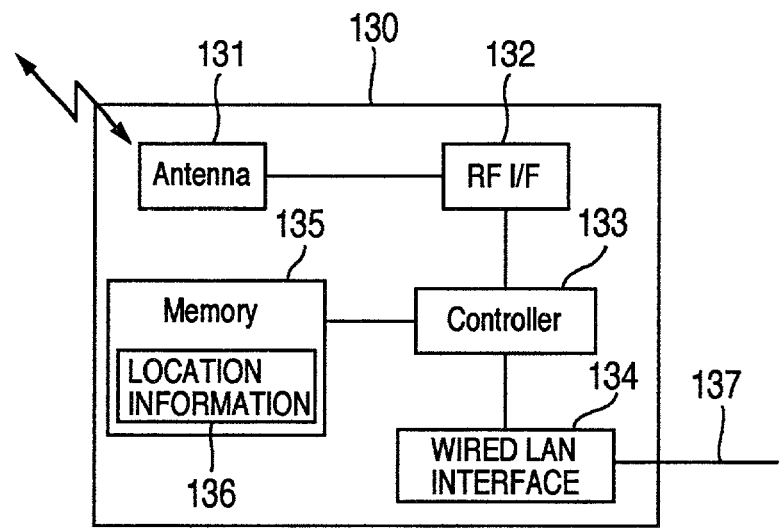
FIG. 3A is a block diagram showing the internal configuration of a wireless hub.

FIG. 2A shows the wireless hub's interference status (location information) detected by the hubs installed as shown in FIG. 1. FIG. 2B shows the location information (setup information) stored in each wireless hub as data indicating the interference relation shown in FIG. 2A. FIG. 3A is a block diagram showing the internal configuration of a wireless hub. FIG. 4 is a flowchart showing the processing of a controller in a wireless hub that sets up a frequency band (channel) to be used by a wireless hub to be newly installed.

FIG. 2A is a diagram schematically showing the relation between the wireless hubs installed in the wireless LAN system in FIG. 1. This figure indicates how many wireless hubs are connected to the wired LAN and which wireless hub is visible to which wireless hub (a wireless hub receiving a radio wave). For example, because there are two wireless hubs in this embodiment, information on only two wireless hubs, 21A and 21B, is present. A wireless hub 21A corresponds to the wireless hub A1 (11A) in FIG. 1, and a wireless hub 21B corresponds to the wireless hub A2 (11B) in FIG. 1. An arrow (20) indicates that the coverage area of the wireless hub A1 overlap with the coverage area of the wireless hub A2. The wireless hubs A1 and A2 each retain information on this status to identify the mutual location relation.

FIG. 2B shows the location information (setup information) stored in each wireless hub as data indicating the interference relation shown in FIG. 2A. Each wireless hub (A1, A2) has information on a channel (CH) that is set up for use by the wireless hub, a signal/noise ratio (S/N) and a packet error rate (Packet Error) indicating the quality of the channel that is set up, and the number of wireless hubs, including itself, in the coverage area (No. of Wireless Stations in Area). The signal/noise ratio refers to the ratio of the signal to the noise of the channel that is used. A high signal/noise ratio indicates lower interference, fewer data errors, and efficient transfer. The packet error rate, also called a bit error rate, refers to the bit error rate of a transferred packet. In addition, the location information preferably includes information identifying the base stations whose coverage areas overlap with the coverage area of each wireless hub (Installation with Overlapping Coverage). Priority information (used when switching one frequency band to another) determined by the above-described information may also be used as a part of setup information (Priority). How to determine and use priority will be described later. Quality information on other channels not set up for each wireless hub (Status of Other Channel), if provided, would make channel change processing easy. Note that the setup information in FIG. 2B indicates the status in which frequency band setup, which will be described later, has already been performed.

FIG. 3A shows the internal configuration of a wireless hub. A wireless hub 130 comprises an antenna 131 that sends and receives a radio signal, a radio frequency (hereinafter called RF) interface 132 that modulates and demodulates a radio signal, a wired LAN interface 134 that transfers information to or from a wired LAN, a controller 133 that controls the components described above, and a memory 135 in which wireless hub setup information and so on are stored.

Location information 136 shown in FIG. 2B is stored in the memory 135. For the location information 136 sent via radio waves, the antenna 131 receives the radio waves from some other wireless hub or a wireless terminal and sends them to the location information file 136 in the memory 135 via the RF interface 132 and the controller 133. For the location information sent via a wired LAN, the wired LAN interface 134 receives the packets from some other wireless hub via the wired LAN 137 and sends the packets to the location information file 136 in the memory 135 via the controller 133.

Figure 3B:
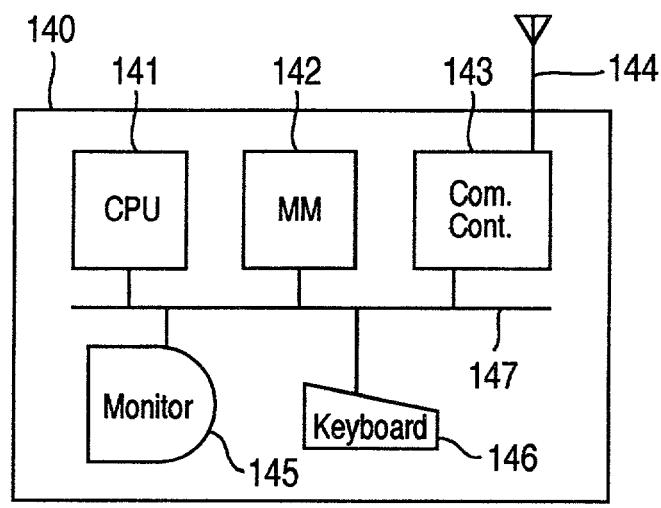
FIG. 3B is a block diagram showing the detail of a wireless terminal.

FIG. 3B shows the details of a wireless terminal 140. The wireless terminal comprises a memory 142 in which data and programs are stored, a CPU 141 that executes programs for processing data, a communication controller 143 that controls radio communication of data between a unit (such as a monitor 145 on which CPU processing results are displayed and a keyboard 146 through which the operator enters instructions and data) and the wireless hub, and a wireless terminal antenna 144. The communication controller 143 receives radio waves from a wireless hub via the antenna 144, converts received data to a form that may be processed by the CPU 141, and outputs converted data to a wireless terminal internal bus 147. In addition, the communication controller 143 converts data, received from the CPU 141 via the bus, to data for use on the wireless LAN and outputs the converted data via the antenna 144. The communication controller 143 receives radio waves output from a wireless hub over a channel originally set up. However, when the corresponding wireless hub has switched the channel to a new channel because of interference and the radio waves of the corresponding wireless hub cannot be detected via the channel that is originally set up, the communication controller 143 scans the channels for the new channel to which the wireless hub has switched. This function allows the controller to continue processing for the wireless hub even if the channel has been switched.

FIG. 4 shows the processing flow of frequency allocation executed by the controller of a wireless hub. The figure is a flowchart showing the operation that is performed when a new wireless hub is added to a wired LAN. In the description below, the wireless hub A2 is added, in FIG. 1, to the existing wired LAN 50 to which the wireless hub A1 is connected.

First, the power of the added wireless hub A2 is turned on (401) to start operation using the initial channel setup (402). A channel refers to a frequency bandwidth that is generated by dividing the frequency bandwidth available for each wireless hub into multiple bandwidths for efficient use of the frequency range. For example, in the wireless LAN, 97 MHz of frequency range, i.e., 2.4 GHz to 2. 497 GHz, is divided into 13 channels.

Next, the channel information set up as the initial value is reflected on the location information stored in the wireless hub A2 403. In this case, because the wireless hub A2 is a newly added device, its location information initially identifies only the wireless hub A2. Next, a scan is performed for all frequency bandwidths (all channels) available for the wireless hub A2 to check to see if there are other wireless hubs in the coverage area of the wireless hub A2 404. A scan refers to an operation that checks to see if the antenna 131 in FIG. 3A receives signals in any of the frequency bandwidth. A wireless hub outputs radio waves in its own bandwidth at a predetermined interval. For example, in this embodiment, the wireless hub A1 outputs radio waves in its own bandwidth at a predetermined interval. Therefore, if there is a wireless hub that uses a channel, the radio wave from that wireless hub should be detected.

If some other wireless hub is present in the coverage area of the wireless hub A2, the information on that wireless hub is added to the location information stored in the wireless hub A2 (406). Because in this embodiment the radio waves of the wireless hub A1 are detected by the scan operation in step 404, the channel information on the wireless hub A1 is added to the location information that has been initially set. Next, based on the location information obtained in this way, a check is made if the number of wireless hubs in the coverage area of the wireless hub A2 exceeds the maximum number of channels that may be selected (407). If this maximum number is exceeded, the wireless hub A2 must be moved to some other location and therefore information is sent to the operator to inform him or her that all channels are in use (408). This information is sent to the operator by lighting up the alarm LED not shown in FIG. 3A, by outputting a sound through the buzzer not shown in FIG. 3A, or by sending signals to the wired LAN to display an alarm message on a terminal such as a personal computer connected to the wired LAN. Because there are two wireless hubs, A1 and A2, in this embodiment, the number of channels is less than 13, for example, in a wireless LAN. If the maximum number is not exceeded as in this example, the location information is used to check if there is no problem with current channel setup 409. If there is a problem with the current channel setup (the channel used by the wireless hub A1 is the same as that used by the wireless hub A2 that was set up during initialization), the channel is switched to a free channel.

The steps described above complete channel setup processing performed by the newly added wireless hub A2 that detects the radio waves from other wireless hubs. After that, it is necessary for the wireless hub A2 to know that there are one or more wireless hubs outside its coverage area. To do so, the newly added wireless hub A2 outputs a broadcast packet over the wired LAN (412) to send the location information in FIG. 2B, to which the information on the wireless hub A2 has been added, to other wireless hubs on the wired LAN. This packet also includes the location information on the wireless hub updated in step 406 or 411.

In response to the broadcast packet, each wireless hub checks if it must send its own information to the wireless hub A2. That is, when a wireless hub is outside the coverage area of the wireless hub A2 or when the scan operation failed for some reason and the information on the wireless hub was not sent to the wireless hub A2, the broadcast packet received via the wired LAN does not include information on that wireless hub. Therefore, upon finding that its information is not included in the broadcast packet, the wireless hub returns a packet, which contains location information on the wireless hub, to the wireless hub A2 over the wired LAN 413.

Upon receiving location information from other wireless hubs, the wireless hub A2 reflects the contents on its own location information. This processing allows a newly added wireless hub to collect all location information. In the above flowchart, although a wireless hub that is turned on sets up channel initial values and starts operation, it is desirable that the operation of a newly added wireless hub be stopped before the channels are set up automatically to prevent interference that may occur before the channels are set up automatically. See the processings of steps 401~416 in FIG. 4.

Figure 5:
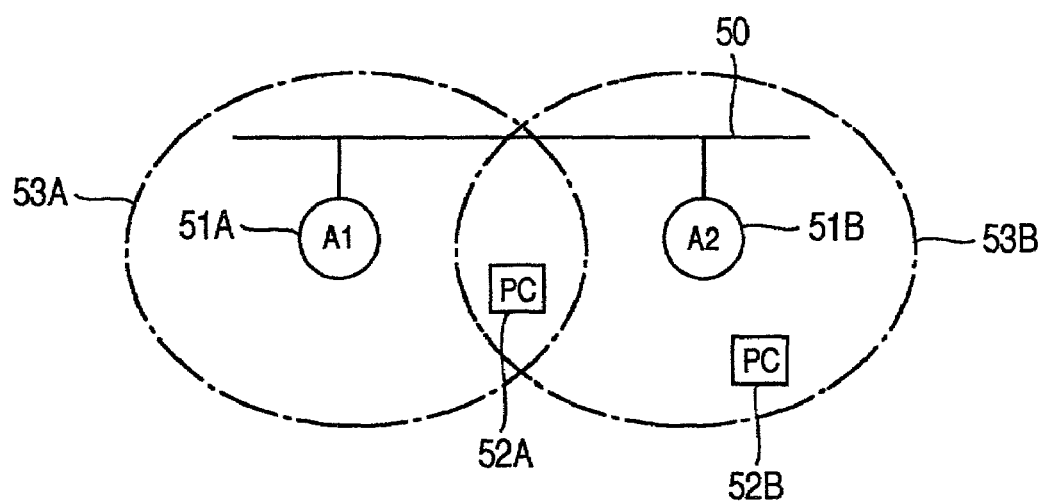
FIG. 5 is a diagram showing an example in which a wireless terminal that does not receive radio waves from, but communicates with, some other wireless hub is in the coverage areas of both wireless hubs.
Figure 6:
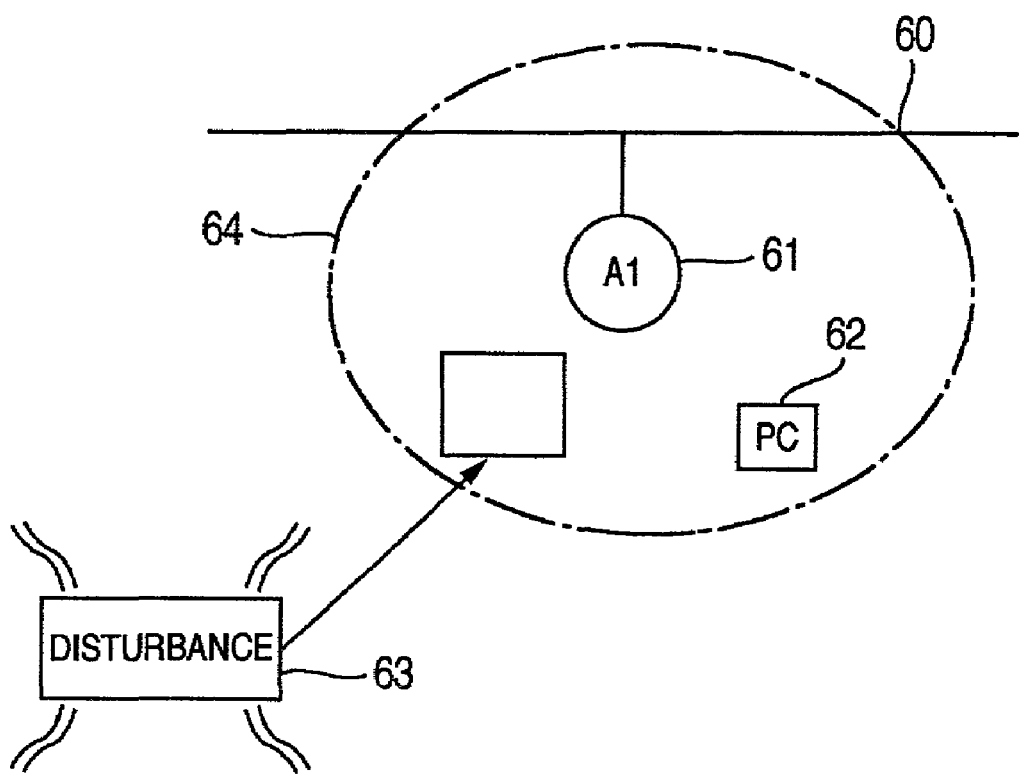
FIG. 6 is a diagram showing a situation in which an external noise is generated.

FIGS. 5 and 6 show a situation in which interference occurs after channel setup. FIG. 5 shows an example in which a wireless terminal, which belongs to one wireless hub, is present in the coverage areas of both wireless hubs; this terminal does not receive radio waves from, but communicates with, another wireless hub. FIG. 6 shows an example in which an external noise is generated. If interference occurs after channel setup, the wireless hub affected by the interference changes the channel setup. This change, in turn, might require a change in the channel setup of other wireless hubs. Assigning priority to the setup change of each wireless hub reduces the number of times the setup of other wireless hubs must be changed. The following describes this priority.

In FIG. 5, two wireless hubs, A1 and A2 (51A, 51B), are connected to the wired LAN (50). The coverage area of the wireless hub A1 (51A) is an area enclosed by 53A, while the coverage area of the wireless hub A2 (51B) is an area enclosed by 53B. In addition, the wireless LAN system in FIG. 5 comprises a wireless terminal (52A) connected to the wireless hub A1 (51A) via radio waves and a wireless terminal (52B) connected to the wireless hub A2 (51B) via radio waves. The wireless terminal 52A, which is in the coverage area 53B of the wireless hub A2 (51B), causes interference to the wireless hub A2 (51B).

Figure 7:
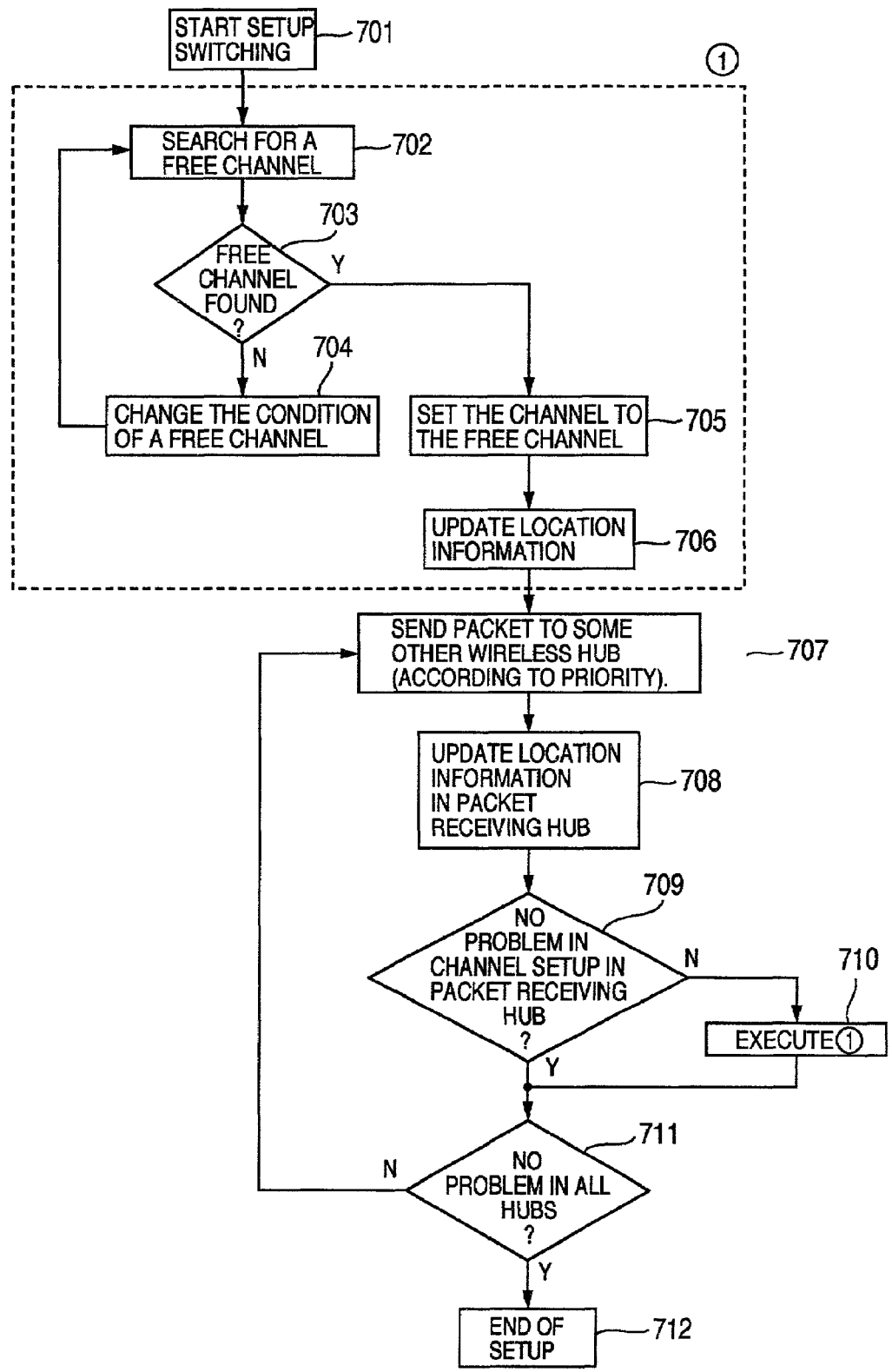
FIG. 7 is a flowchart showing the processing flow of the wireless hub controller when the channel setup that is set up in FIG. 4 is changed.

FIG. 6 shows a wireless LAN system that comprises a wireless hub A1 (61) connected to a wired LAN and a wireless terminal (62) connected to the wireless hub A1 (61) via radio waves. In FIG. 6, the wireless hub 61 is affected by interference caused by an external noise 63 that generates a radio wave with the same bandwidth as that of the radio wave used by the wireless hub in the coverage area 64 of the wireless hub A1 (61). FIG. 7 is a flowchart showing the channel setup change operation that is performed when interference occurs, as shown in FIGS. 5 and 6, after the channels have been set up.

Upon detecting interference, the wireless hub starts channel setup switching processing (701). In FIG. 5, the wireless hub A2 affected by the interference first checks its own location information to search for a free channel available for setup (702). That is, the wireless hub uses the location information to search for a free channel to which no wireless hub is allocated. If no free channel is available, the wireless hub changes the allowable range of the signal/noise ratio or the packet error rate (704) and changes the channel to the one satisfying the condition best. The wireless hub reflects this change on the location information stored in the wireless hub (706). Next, the wireless hub sends a packet, via the wired LAN, to the highest-priority wireless hubs according to the priority set up in the location information to inform that the setup has been changed (707). In FIG. 5, the wireless hub A1 receives this packet. How to assign priority will be described in the description of FIG. 9B.

The wireless hub A1 updates the location information (708) and checks if there is a problem with its own channel setup (709). If there is a need to change its setup, the wireless hub A1 executes processing enclosed by the broken line ① in the figure (steps 702 to 706) (710) and, after channel setup, sends a packet to the next-higher-priority wireless hub again (707).

Processing described above is performed for all other wireless hubs. This operation allows the channels to be optimally set up to minimize interference with wireless hubs. That is, when interference occurs after channel setup, the channel setup of the wireless hub where the interference occurred is changed first. After that, channels are allocated according to the priority. This method changes the channel setup effectively while preventing channel allocation conflicts.

The same procedure may also be used to reset the location information when interference is caused, as shown in FIG. 6, by an external noise from another wireless hub or an electronic unit operating in the same bandwidth as that of the wireless hub.

It is also possible to acquire, in advance, information on other wireless hubs outside the coverage area and to use the acquired information when changing the setup. For example, even if there is no free channel, there is no problem with sharing a channel used by a wireless hub affected neither by the wireless hub A2 nor by the wireless hub A1. Therefore, the channel may be changed to that channel. An example in that situation will be described below.

Figure 8:
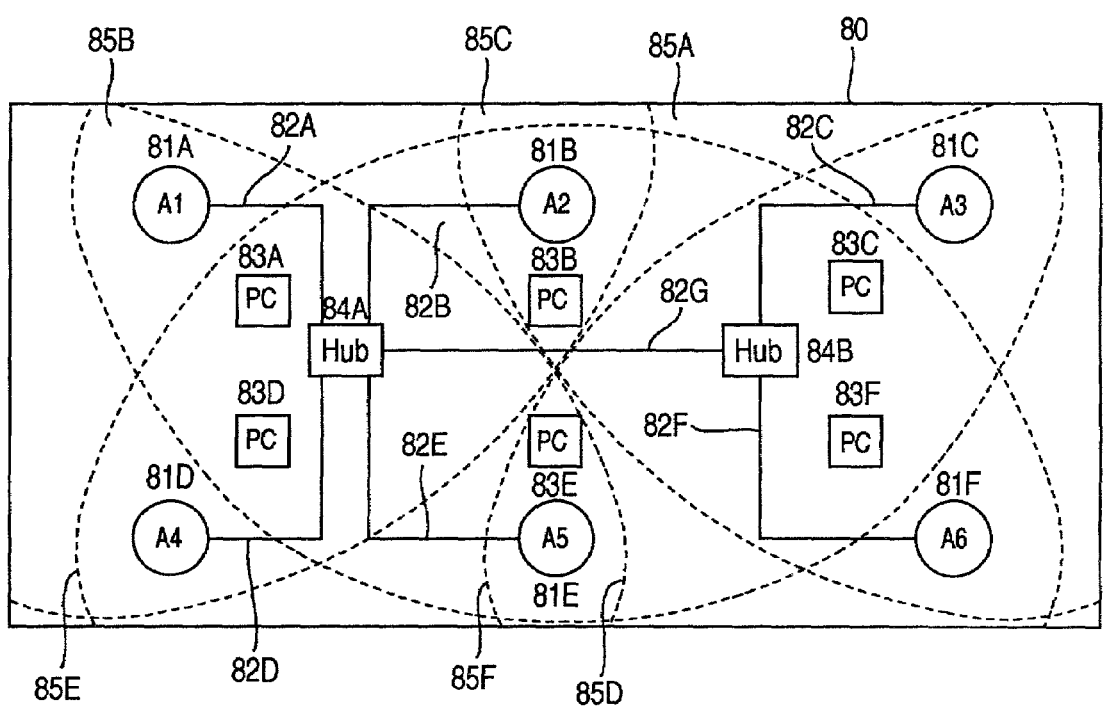
FIG. 8 is a diagram showing a large-scale LAN system to which a plurality of wireless hubs are connected.

FIG. 8 is a diagram showing a third embodiment of the present invention. The wireless LAN system in FIG. 8 comprises wired LANs, three or more wireless hubs, and a plurality of wireless terminals connected to the wireless hubs via radio waves.

In FIG. 8, a wireless hub area (80) includes wireless hubs A1–A6 (81A–81F) and six wireless terminals (83A–83F). The wireless hub A1 (81A) is connected to a hub (84A) via a wired LAN (82A), the wireless hub A2 (81B) is connected to the hub (84A) via a wired LAN (82B), the wireless hub A3 (81C) is connected to a hub (84B) via a wired LAN (82C), the wireless hub A4 (81D) is connected to the hub (84A) via a wired LAN (82D), the wireless hub A5 (81E) is connected to the hub (84A) via a wired LAN (82E), and the wireless hub A6 (81F) is connected to the hub (84B) via a wired LAN (82F).

In addition, the hub (84A) and the hub (84B) are connected via a wired LAN (82G). The wireless hubs are connected to the wireless terminals (83A–83F) via radio waves. The wireless terminal (83A) is connected to the wireless hub A1 (81A), the wireless terminal (83B) is connected to the wireless hub A2 (81B), the wireless terminal (83C) is connected to the wireless hub A3 (81C), the wireless terminal (83D) is connected to the wireless hub A4 (81D), the wireless terminal (83E) is connected to the wireless hub A5 (81E), and the wireless terminal (83F) is connected to the wireless hub A6 (81F).

Figures 9A, 9B:
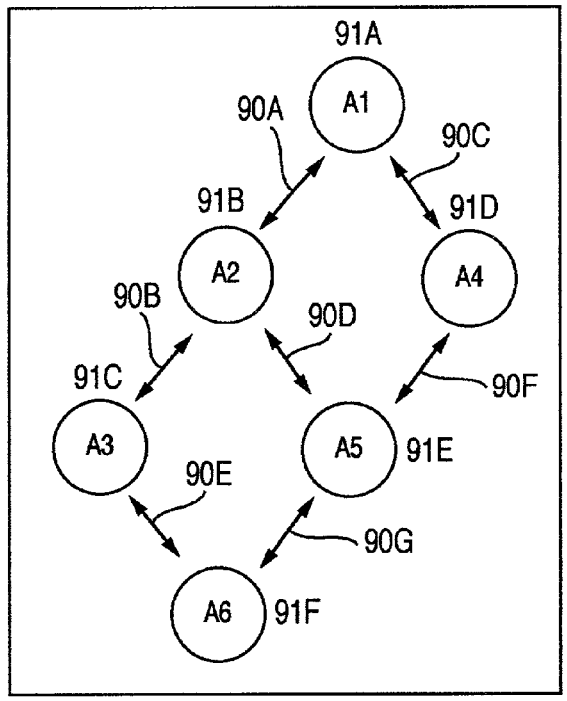
FIG. 9A is a diagram schematically showing the interference status of the wireless LAN system shown in FIG. 8.
FIG. 9B is a diagram showing location information (setup information) stored in each wireless hub as data indicating the interference relation shown in FIG. 9A.

FIGS. 9A and 9B show the location information on this layout, where the coverage area of the wireless hub A1 (81A) is indicated by 85A, the coverage area of the wireless hub A2 (81B) is indicated by 85B, the coverage area of the wireless hub A3 (81C) is indicated by 85C, the coverage area of the wireless hub A4 (81D) is indicated by 85D, the coverage area of the wireless hub A5 (81E) is indicated by 85E, and the coverage area of the wireless hub A6 (81F) is indicated by 85F.

FIG. 9A schematically shows the location relation of the layout shown in FIG. 8.

Numeral 81A in FIG. 8 corresponds to 91A, 81B to 91B, 81C to 91C, 81D to 91D, 81E to 91E, and 81F to 91F, respectively. Arrows 90A to 90G indicate that the coverage areas overlap. For example, the coverage area of the wireless hub A1 (91A) overlaps those of the wireless hubs A2 (91B) and A4 (91D). This figure also indicates that the wireless hubs A3 (91C), A5 (91E), and A6 (91F) are outside the coverage area of the wireless hub A1 (91A). FIG. 9B indicates location information to which priority is assigned according to this location relation.

FIG. 9B shows setup information (location information) on the wireless hubs. Each wireless hub has the following entries: the channel (CH) set up for and used by the wireless hub, signal/noise ratio (S/N) and packet error rate (Packet Error) indicating the quality of the channel that is set up, and the number of wireless hubs including itself that are present in the coverage area (No. of Wireless Stations in Area). Preferably, each has an entry for information identifying the wireless hubs whose coverage areas overlap with the coverage area this wireless hub (Installation with Overlapping Coverage).

This setup information also contains priority information (Priority). The more wireless stations in the area, the higher the priority is. This is because channel setup flexibility is limited as more coverage areas overlap, although the priority depends on the number of available channels. In the case of FIG. 9A, because the wireless hubs 91B and 91E each have the highest number (4) of overlapping coverage areas, the priority is set higher than the priority of other wireless hubs. When the number of wireless stations in one area is equal to that in another, the signal/noise rations are compared as the next key and a higher priority is assigned to the wireless hub with a lower signal/noise ratio. If an equal comparison still results, the packet error rate and other information are used to determine priority. The priority that is set up in this way is assigned to each wireless hub when processing steps in the setup flow in FIG. 4 end. Setup change processing is performed according to the setup flow shown in FIG. 7.

If the condition of a channel other than the one set up for a wireless hub is bad, this condition should be considered during channel setup. Doing so prevents possible repeated channel resetting and makes it possible to perform quick and optimum channel setup.

Figure 10:
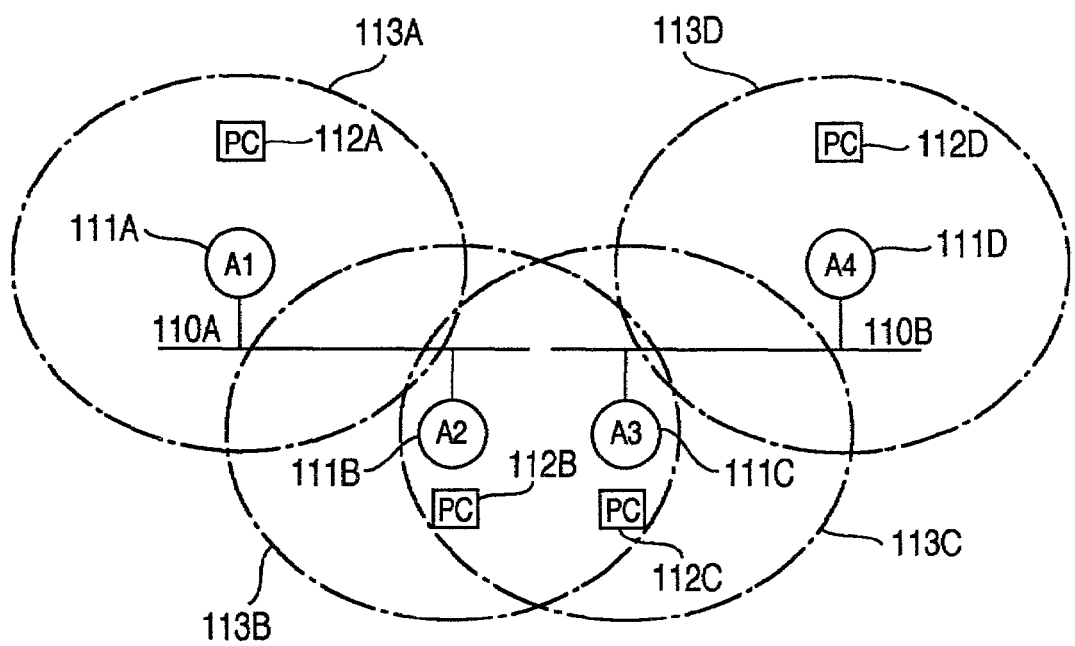
FIG. 10 is a diagram showing a wireless LAN system combined with a plurality of wired LAN systems.
Figure 11:
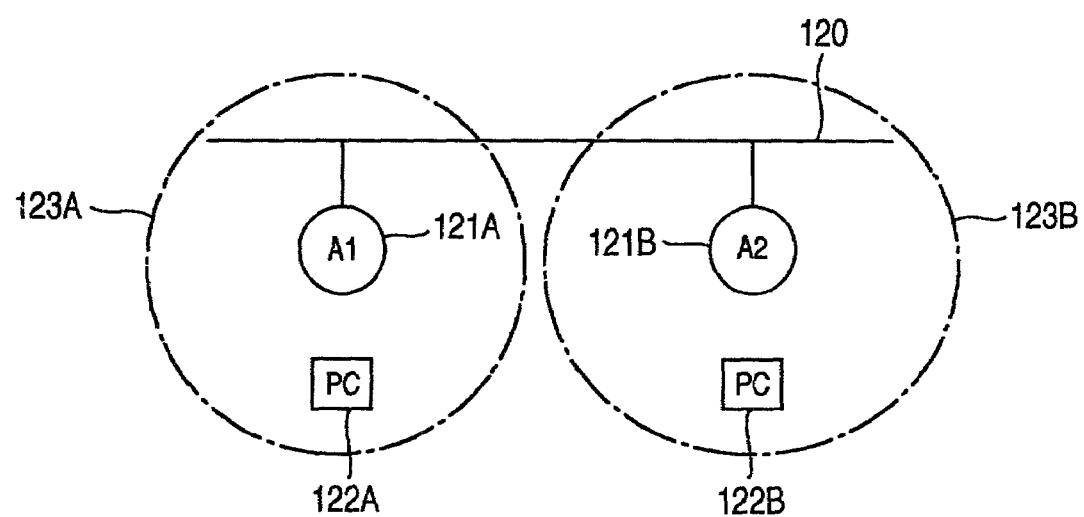
FIG. 11 is a diagram showing a wireless LAN system in which two wireless hubs are located such that their coverage areas do not overlap.

FIG. 10 shows an example of the configuration of a wireless LAN system in which two wired LANs are present. Wireless hubs A1 (111A) and A2 (111B) are connected to a wired LAN (110A), while wireless hubs A3 (111C) and A4 (111D) are connected to a wired LAN (110B). Wireless terminals (112A–112D) are connected to the wireless hubs A1–A4 (111A–111D), respectively. The wireless terminal (112A) is connected to the wireless hub A1 (111A), the wireless terminal (112B) is connected to the wireless hub A2 (111B), the wireless terminal (112C) is connected to the wireless hub A3 (111C), and the wireless terminal (112D) is connected to the wireless hub A4 (111D), respectively.

The coverage areas of the wireless hubs A1–A4 (111A–111D) are 113A for the wireless hub A1 (111A), 113B for the wireless hub A2 (111B), 113C for the wireless hub A3 (111C), and 113D for the wireless hub A4 (111D). As shown in FIG. 10, the wireless hubs A2 (111B) and A3 (111C) and the wireless terminals (112B, 112C) are present in the overlapped area between the coverage areas 113B and 113C.

When location information required for setup is exchanged between separate wired LANs, a wireless terminal present in the area described above where the coverage areas overlap is used. For example, to reflect the location information about a wireless hub connected to the wired LAN 110A upon the wired LAN 110B in the example shown in the figure, the location information is sent from the wireless hub 111B to the wireless terminal 112B and the wireless terminal forces the connection address to switch to the wireless hub 111C to send the location information about the wired LAN 110A to the wireless hub 111C. The wireless hub 111C sends this information to the wireless hub 111D via the wired LAN 110B. This information exchange operation allows wireless hubs connected to different wired LANs to share location information and to automatically set up the channels. Note that the method described above is not applicable when the coverage area of a wireless hub or a wireless terminal does not overlap the coverage area of another wireless hub or a wireless terminal connected to a different wired LAN. However, there is no problem in this case because there is no interference.

The invention claimed is:

1. A base station using direct sequence spread spectrum (DS) connected to a wired LAN (Local Area Network), comprising:
   a wired communication unit connected to said wired LAN;
   a wireless communication unit that communicates with a LAN terminal via a radio wave;
   a controller that detects a first device issuing a radio wave in a first frequency band, said first device being in a coverage area of the base station; and
   a memory storing location information representing overlapping coverage areas with other adjacent wireless stations;
   wherein said controller, when said first device is detected, updates said location information memory and sets up a second frequency band as an available band, said second frequency band being different from said first frequency band, based on the information stored in said location information memory and transmits the information of said location information memory to another base station adjacent to said base station.

2. The base station according to claim 1, wherein said first device is another base station connected to the wired LAN.

3. The base station according to claim 2, wherein said controller sends a radio signal in the second frequency band, which has been set up, to said another base station.

4. The base station according to claim 1, wherein said first device is a wireless terminal that communicates, via a radio wave, with another base station connected to said wired LAN.

5. The base station according to claim 4, wherein said controller sends a radio signal in the second frequency band, which has been set up, to said another base station.

6. The base station according to claim 1, further comprising:
   a storage unit in which various types of information is stored,
   wherein said controller creates communication status information on the first frequency band and said storage unit stores therein the communication status information.

7. A base station comprising:
   a wired interface connected to a wired LAN;
   a wireless interface that communicates with wireless terminals;
   a controller that detects a surrounding communication environment using said wireless interface; and
   a memory storing location information representing overlapping coverage areas with other adjacent wireless stations;
   wherein said controller, in response to a result of detecting the surrounding communication environment, updates said location information memory and sends information on an initial frequency band to another wireless device in the surrounding communication environment and the information of said location information memory detected by said controller, said initial frequency band being set up by said controller.

8. The base station according to claim 7, wherein said controller resets the initial frequency band to another frequency band in response to a request from said another wireless device.

9. The base station according to claim 7, wherein said base station sends the information on the initial frequency band to the another wireless device according to a predetermined priority, said information being set up by said base station.

10. A method for setting up an available frequency band for use in a first base station which comprises a wired communication unit connected to a wired LAN and a wireless communication unit communicating with a first wireless terminal via a radio wave, said method comprising the steps of:
   checking, with the use of said wireless communication unit, if there is a first device that outputs a radio wave in a wireless coverage area of said first base station; and if there is the first device, updating location information representing overlapping coverage areas with adjacent base stations and setting up a frequency band, which is different from the frequency band of the radio wave output by said first device, as the frequency band for use by said first base station.

11. The method for setting up a frequency band to be used according to claim 10, wherein the first device is a second base station connected to the wired LAN.

12. The method for setting up a frequency band to be used according to claim 11, further comprising the step of sending information on the frequency band to be used that is set in the second base station and the information of said location information memory.

13. The method for setting up a frequency band to be used according to claim 10, wherein said first device is a wireless terminal that communicates, via radio waves, with other base stations connected to the wired LAN.

14. The method for setting up a frequency band to be used according to claim 13, further comprising the step of sending information on the frequency band to be used that is set in the second base station.

15. The method for setting up a frequency band to be used according to claim 10, further comprising the steps of:
creating communication status information on the first frequency band by a controller of the first base station; and
storing the communication status information in a storage unit of the first base station,
wherein the second frequency band is set up as the frequency band to be used according to the communication status information.

16. The method for setting up a frequency band according to claim 10, wherein the method is used by said wireless communication unit that communicates with the wireless terminal in a direct sequence method.

17. A base station connected to a wired LAN, comprising:
a wired communication unit connected to the wired LAN;
a wireless communication unit that communicates with a LAN terminal via radio waves using direct sequence spread spectrum; and
a memory recording setup information of a frequency band communicating with said wireless terminal and location information representing overlapping coverage areas with other adjacent wireless stations;
wherein when said controller detects said first device using a first frequency band, said controller updates said location information memory and sets up a second frequency band as a band for use by said base station, said second frequency band being different from said first frequency band, based on the information stored in said location information memory and transmits the information of said location information memory to another base station adjacent to said base station;
wherein the setup information and the location information recorded in said memory are sent to another wireless base station connected to the wired LAN.

18. For use in a base station which comprises a wired connection unit connected to a wired LAN and a wireless communication unit communicating with a LAN terminal via radio waves using direct sequence spread spectrum, a method for setting up a frequency band of radio waves to be used by said wireless communication unit, said method comprising the steps of:
finding frequency bands which belong to a predetermined plurality of frequency bands and which are already used by other devices in a place where the base station is installed;
setting up a frequency band not used by the other devices as a frequency band for use by the wireless communication unit; and
creating, based on a result of said finding step, a table including location information representing overlapping coverage areas with adjacent other wireless communication units and frequency bands to be used by said other communication units and holding the created table.

19. The method for setting up a frequency band to be used by a base station according to claim 18, wherein said step of finding frequency bands is executed by said wireless communication unit scanning the radio waves of the plurality of frequencies for detecting frequency bands used.

20. The method for setting up a frequency band to be used by a base station according to claim 18, further comprising the step of sending said table to other base stations connected to said wired LAN.

21. The method for setting up a frequency band to be used by a base station according to claim 20, wherein the base station updates the table thereof based on the table received from some other base stations.

22. The method for setting up a frequency band to be used by a base station according to claim 18, wherein said plurality of frequency bands are 13 frequency bands ranging from 2.4 GHz to 2.947 GHz.

23. The method for setting up a frequency band to be used by a base station according to claim 18, further comprising the step of, when it is found in said step of finding frequency bands that the predetermined plurality of frequency bands are all used by other devices, indicating that there is no frequency band available to the base station.

24. The method for setting up a frequency band to be used by a base station according to claim 23, wherein a fact that there is no available frequency band is visually output.

25. The method for setting up a frequency band to be used by a base station according to claim 18, wherein, if it is found that, after setting up a frequency band to be used by the base station in said step of setting up a frequency band, there is another device using the frequency band, the frequency band to be used is changed to another frequency band.

26. For use in a base station which comprises a wired connection unit connected to a wired LAN and a wireless communication unit communicating with a LAN terminal via radio waves using direct sequence spread spectrum, a method for setting up a frequency band of radio waves to be used by said wireless communication unit, said method comprising the steps of:
finding a first frequency band which belongs to a predetermined plurality of frequency bands and which is not used by other devices in a place where the base station is installed;
setting up the first frequency band as a frequency band to be used by the wireless communication unit; and
creating, based on a result of said finding step, a table including location information representing overlapping coverage areas with adjacent other wireless communication units and frequency bands to be used by said other communication units and holding the created table.

27. The method for setting up a frequency band to be used by a base station according to claim 26, further comprising the step of creating and retaining a table based on a result of said step of finding a frequency band, said table containing at least information identifying the other devices that were found and frequency bands to be used by the devices.

28. The method for setting up a frequency band to be used by a base station according to claim 26, wherein the plurality of frequency bands are 13 frequency bands ranging from 2.4 GHz to 2.947 GHz.

29. The method for setting up a frequency band to be used by a base station according to claim 26, further comprising the step of, when it is found in said step of finding a frequency band that the predetermined plurality of frequency bands are all used by other devices, indicating that there is no frequency band available to the base station.

30. The method for setting up a frequency band to be used by a base station according to claim 29, wherein a fact that there is no available frequency band is visually output.

31. The method for setting up a frequency band to be used by a base station according to claim 26, wherein, if it is found that, after setting up a frequency band to be used by the base station in said step of setting up a frequency band, there is another device using the frequency band, the frequency band to be used is changed to another frequency band.

32. For use in a base station which comprises a wired connection unit connected to a wired LAN and a wireless communication unit communicating with a LAN terminal via radio waves using direct sequence spread spectrum, a method for setting up a frequency band of radio waves to be used by said wireless communication unit, said method comprising the steps of:

finding frequency bands which belong to a predetermined plurality of frequency bands and which are received by other devices in a place where the base station is installed;

setting up a frequency band not used by the other devices as a frequency band to be used by the wireless communication unit; and creating, based on a result of said finding step, a table including location information representing overlapping coverage areas with adjacent other wireless communication units and frequency bands to be used by said other communication units and holding the created table.

* * * * *